United States Patent [19]

von der Haar et al.

[11] Patent Number: 5,046,569
[45] Date of Patent: Sep. 10, 1991

[54] METHOD AND DEVICE FOR A PULSATION-FREE, CONTINUOUS AND GRAVIMETRIC DOSING

[75] Inventors: Paul von der Haar, Göttingen; Madhukar Pandit, Kaiserslautern; Hermann Merz, St. Ingbert, all of Fed. Rep. of Germany

[73] Assignee: Sartorius AG, Göttingen, Fed. Rep. of Germany

[21] Appl. No.: 614,131

[22] Filed: Nov. 16, 1990

[30] Foreign Application Priority Data

Nov. 24, 1989 [DE] Fed. Rep. of Germany ....... 3938898

[51] Int. Cl.$^5$ .................... G01G 19/52; G01G 13/02; G01G 23/10; B67D 5/08
[52] U.S. Cl. .................................... 177/50; 177/123; 177/185; 222/55
[58] Field of Search ..................... 177/50, 123, 185; 222/55

[56] References Cited

U.S. PATENT DOCUMENTS

| | | | |
|---|---|---|---|
| 4,467,844 | 8/1984 | Di Gianfilippo et al. | 177/50 X |
| 4,648,430 | 3/1987 | Di Gianfilippo et al. | 177/60 X |
| 4,722,456 | 2/1988 | Laidlaw et al. | 177/185 |

Primary Examiner—George H. Miller, Jr.
Attorney, Agent, or Firm—Eric P. Schellin

[57] ABSTRACT

The gravimetric control of a mass flow from or into a container located on a balance using a pulsating dosing pump, the output signal of the balance is digitally filtered in such a manner that the course in time of the mass flow is cyclically estimated from the filtered wighing signal. This estimated value of the course in time of the mass flow is used to calculate the course in time of an auxiliary mass flow which compensates the pulsation of the mass flow of the pulsating dosing pump and a speed course is calculated from the course in time of the auxiliary mass flow for driving an auxiliary dosing pump.

10 Claims, 3 Drawing Sheets

METHOD AND DEVICE FOR A PULSATION-FREE, CONTINUOUS AND GRAVIMETRIC DOSING

BACKGROUND OF THE INVENTION

The invention relates on the one hand to a method for the gravimetric control of a mass flow from a or into a container located on a balance using an intermittent dosing pump and on the other hand to a device for the gravimetric control of a mass flow with a dosing pump which doses the material to be doesed from a or into a container located on a balance, whereby the delivery force of the dosing pump comprises pulsating components; and with a control unit which regulates the delivery force of the dosing pump on the basis of the output signal of the balance in such a manner that the average time value of the delivery force achieves a set theoretical value.

A method and a device of this type are known from the journal article "Use of a Microprocessor-Controlled Dosing Device in Biotechnology" by K. Memmert, R. Uhlendorf and C. Wandrey in Chemie-Ingenieur-Technik 59 (1987), No. 6, pp. 501-504.

A disadvantage of this known method and of this known device is that fact that for a use under sterile conditions, practically only pumps are known whose delivery flow is composed of individual delivery impulses. Hose pumps and membrane pumps are cited in the above-mentioned article as example. This pulsation is not problematic for any applications and it is sufficient to maintain the average time value at the set theoretical value. However, the pulsating component is problematic for some applications, especially in the case of very slight dosing flows, and the invention has the problem of indicating a method and a device for pulsation-free, gravimetric dosing.

SUMMARY OF THE INVENTION

The invention solves this problem in a method for the gravimetric control of a mass flow in that the output signal of the balance is digitally filtered. The course in time of the mass flow is cyclically estimated from the filtered weighing signal. This estimated value of the course in time of the mass flow is used to calculate the course in time of an auxiliary mass flow which compensates the pulsation of the mass flow of the pulsating dosing pump. A rotational speed course is calculated from the course in time of the auxiliary mass flow for driving an auxiliary dosing pump.

This is achieved in the device for the gravimetric control of a mass flow in that an auxiliary dosing pump is connected in parallel to the dosing pump, that the delivery force of the auxiliary dosing pump is regulated by the control unit in such a manner that the sum of the delivery forces of the two pumps is free of pulsations and that the delivery force of the main dosing pump is regulated by the control unit in such a manner that the sum of the delivery forces is maintained at the set theoretical value.

BRIEF DESCRIPTION OF THE DRAWINGS

The invention is described in the following with reference made to the figures.

FIG. 5 shows a scheme of a digital triple polynomial filter.

DETAILED DESCRIPTION OF THE INVENTION

Figure 1:
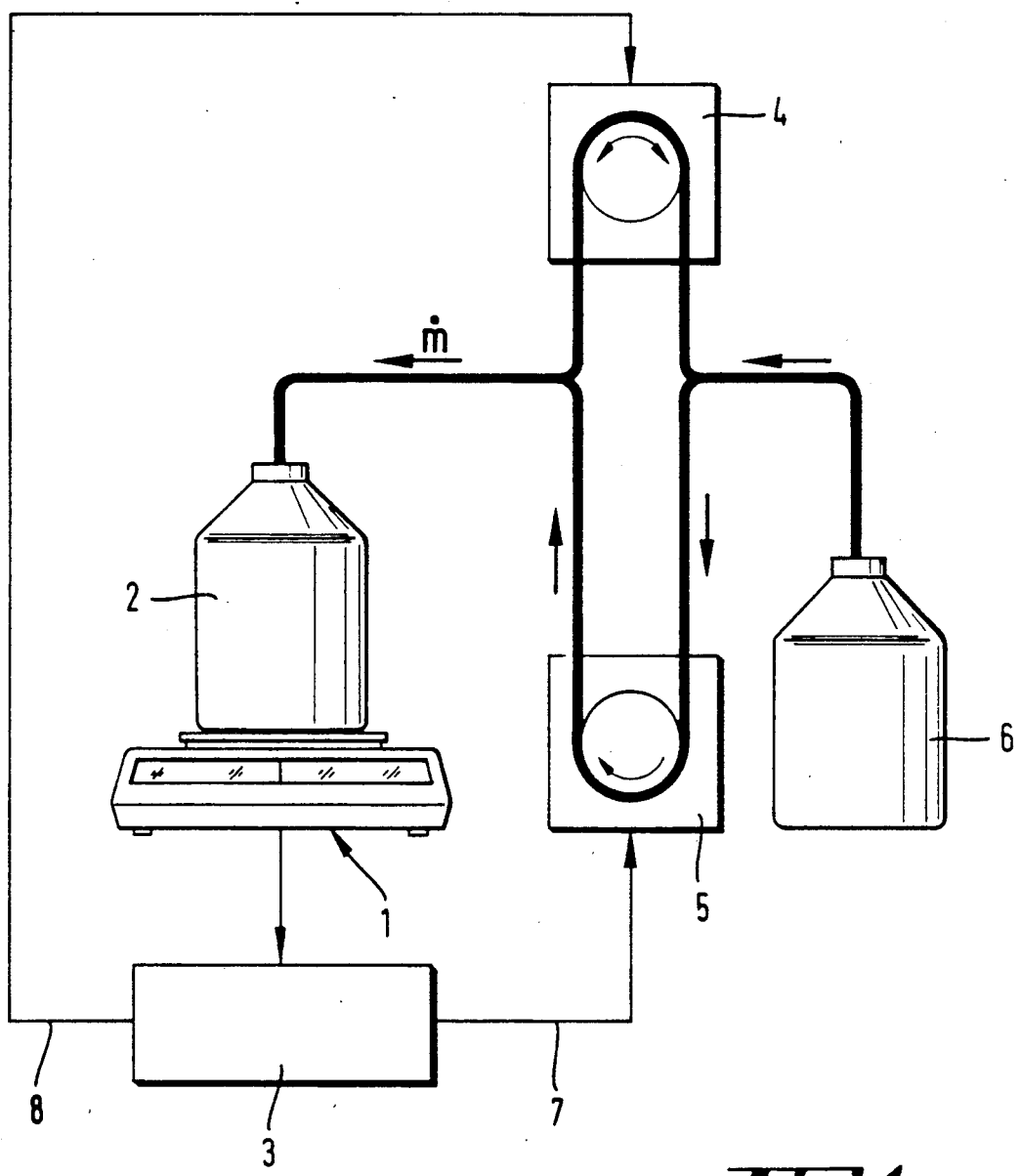
FIG. 1 shows a schematic view of the dosing device.

The processing container which is to receive the dosing is designated by reference numeral 2 in the schematic view of the dosing device in FIG. 1. This processing container 2 stands on a balance 1 whose output signal is fed to a control unit 3. This control unit 3 regulates dosing peristaltic pump 5 via lead 7, which dosing pump delivers the medium to be dosed from a storage container 6 into processing container 2. Control unit 3 also controls an additional auxiliary dosing pump 4 via lead 8.

Figure 2:
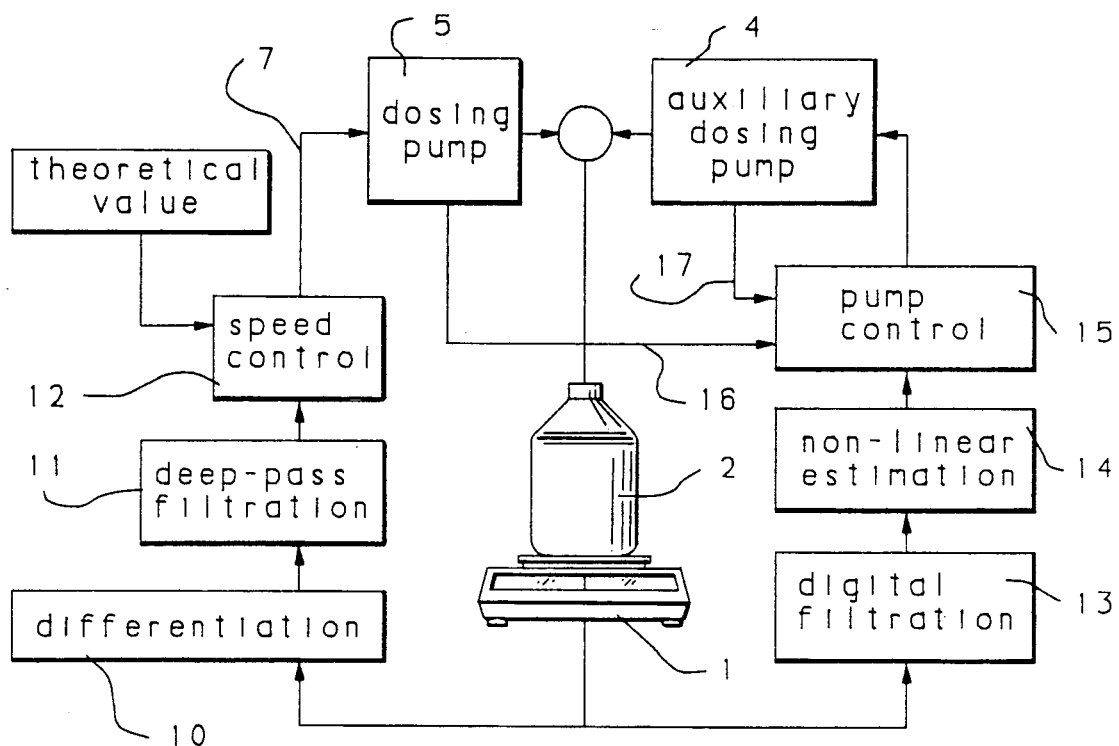
FIG. 2 shows a flow chart of the dosing process.

The interplay of these components during dosing results from the flow chart in FIG. 2. Processing container 2 and balance 1 are shown in the middle. The balance output signal is proportional to the total mass of processing container 2 with contents. The change in mass per unit of time and therewith the instantaneous inflow of mass is determined by means of differentiation in functional module 10. This value is filtered in functional module 11 by a deep pass, which suppresses momentary disturbances in the output signal of balance 1 and the pulsating components in the mass flow. This average value for the inflow of mass is compared in functional module 12 with the set theoretical value and, depending on the result of this comparison, the speed of peristaltic pump 5 is increased, lowered or maintained constant. This control loop which has just been described and is shown on the left in FIG. 2 is already known.

In addition, FIG. 2 shows a second loop on the right which drives auxiliary dosing pump 4. In this loop, the output signal of the balance is first filtered in digital filter 13. This digital filter 13 can be e.g. a triple polynomial filter, as is described in more detail further below for FIG. 5. This filtered signal is fed to a non-linear estimator 14 in which the course in time of an auxiliary mass flow is estimated in such a manner that the sum of the auxiliary mass flow and the mass flow of dosing pump 5 is time-independent, that is, pulsation-free. Auxiliary dosing pump 4 is then driven via pump control 15 in such a manner that it generates the estimated auxiliary mass flow. The loop shown on the right in FIG. 2 with auxiliary dosing pump 4 therefore serves only to smooth the pulsation of dosing pump 5 and the adjustment to the required theoretical value of the mass flow to be dosed and the long-time constant maintenance of this theoretical value takes place in an unchanged manner by means of the control of the speed of dosing pump 5 via the control loop shown on the left in FIG. 2. In order to synchronize the rotary motion of auxiliary dosing pump 4 with the rotary motion of dosing pump 5, pump control 15 requires information about the current angular positions of auxiliary dosing pump 4 and of dosing pump 5. It obtains this information via leads 16 and 17.

Figure 3:
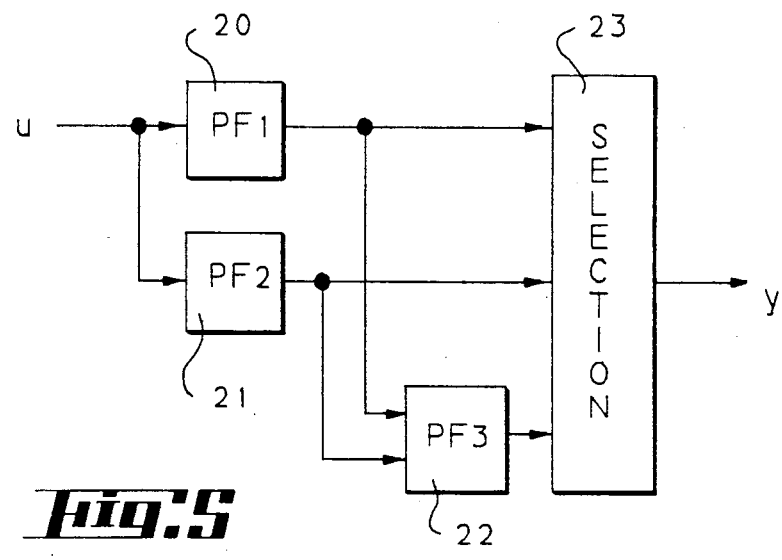
FIG. 3 shows the course in time of the delivery force of a peristaltic pump.
Figure 3:
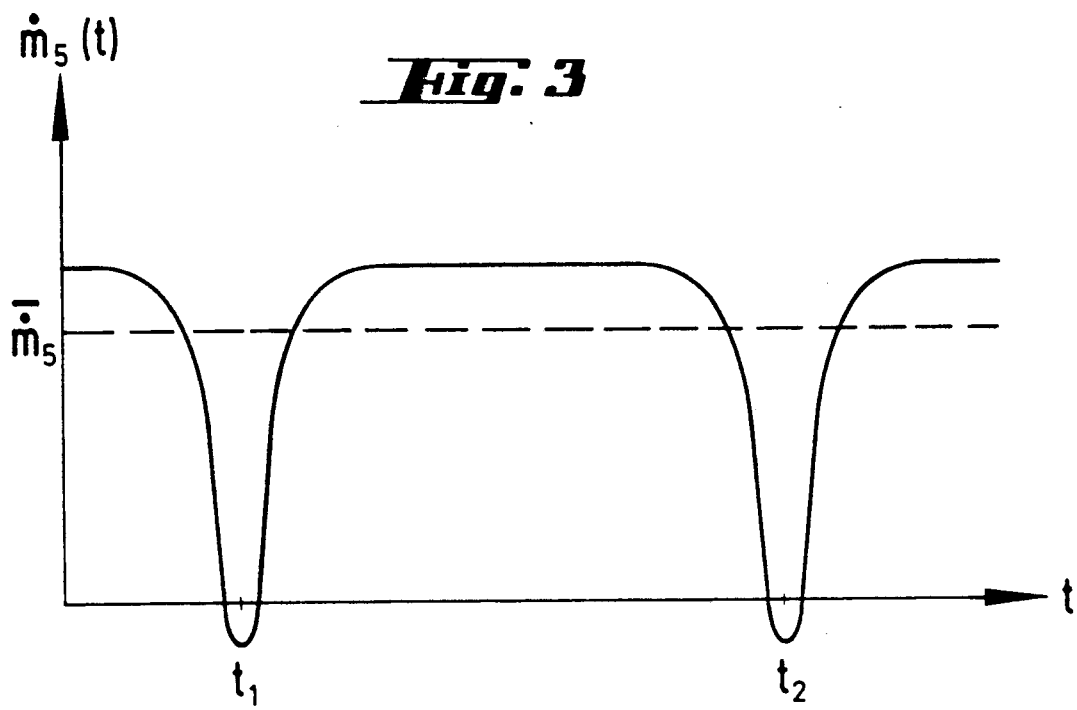

FIG. 3 shows an example for the time-dependent course of the delivery force of a peristaltic pump. The time t is entered horizontally and the delivery force m is entered vertically. A sharp break occurs after an approximately constant delivery force during the greatest part of a rotation which break can extend to negative values of the delivery force (reversal of the direction of delivery) at the point in time at which the squeezing roller has concluded the squeezing phase and the hose returns back into its round cross-sectional form. The time from $t_1$ to $t_2$ corresponds in the case of a pump head with two squeezing rollers to one half a rotation of the pump head. The average time value of the delivery force is sketched in dotted lines in FIG. 3.

Figure 4:
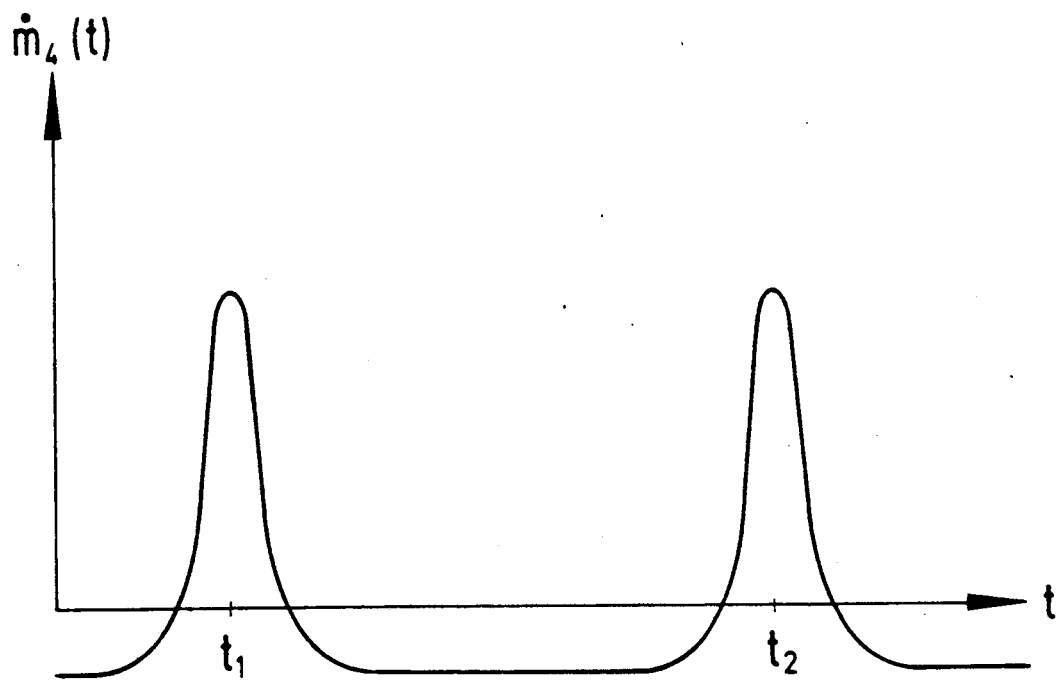
FIG. 4 shows the course in time of the delivery force of the auxiliary dosing pump.

In order to supplement the course of the delivery force of dosing pump 5 shown in FIG. 3 by means of the delivery force of an auxiliary dosing pump 4 to a pulsation-free total delivery force, the delivery force of auxiliary dosing pump 4 must exhibit the course shown in FIG. 4. This course is estimated by estimator 14 (FIG. 2) in accordance with mathematical methods from the filtered output signal of balance 1 and converted by pump control 15 (FIG. 2) into corresponding adjustment commands for the drive of auxiliary dosing pump 4. The drive of auxiliary dosing pump 4 can take place e.g. by means of a stepping motor, which results in the possibility of a simple control both forwards and backwards. Auxiliary dosing pump 4 can also be e.g. a peristaltic pump like dosing pump 5. In FIG. 4, the average time value of the delivery force $m_4$ of the auxiliary dosing pump is zero. Auxiliary dosing pump 4 can therefore always be operated in a range of approximately constant delivery force per angle of rotation and does not need to reach the range in the vicinity of times $t_1$ and $t_2$ in FIG. 3. As a result thereof, the conversion factor between angle of rotation and delivery force for auxiliary dosing pump 4 is practically constant and the mathematics for the conversion correspondingly simple. This operation of auxiliary dosing pump 4 with an average delivery force of zero is especially advantageous but not absolutely necessary.

It is best if estimator 14 receives its information via the course of the delivery force of auxiliary dosing pump 4 in that dosing pump 5 stands still in a learning phase and auxiliary dosing pump 4 executes a few revolutions. Estimator 14 can then obtain the course of the delivery force of auxiliary dosing pump 4 from the output signal of balance 1 under processing container 2.

Estimator 14 receives its information via the course of the delivery force of dosing pump 5 in that it estimates the course in time of massflow m which represents the sum of mass flow $m_5$ of dosing pump 5 and of auxiliary mass flow $m_4$ of auxiliary dosing pump 4, from the output signal of balance 1 under processing container 2. If the auxiliary mass flow $m_4$ of auxiliary dosing pump 4, which can be calculated with the information from the learning phase, is subtracted from the estimated mass flow m, one has the course in time of mass flow $m_5$ of dosing pump 5.

Estimating device 14 supplies the information about the current mass flow m with a constant delay conditioned by digital filtration 13 so that he control profile for auxiliary dosing pump 4 is not used for compensation until the next-following cycle.

In order to suppress small disturbances in the output signal of balance 1 which stem e.g. from vibrations or the impact of the dosed medium without reducing too greatly the reaction speed of the balance and of the dosing control, it is advantageous if only one analog prefiltration with an upper limiting frequency of approximately 20 Hz is built into balance 1 and if the digital filter 13 shown in FIG. 2 exhibits the filter structure shown in FIG. 5. This so-called triple polynomial filter consists of three polynomial filters 20, 21 and 22 by means of which the digital output signal of balance 1 is freed in accordance with mathematical methods of disturbances not suppressed by the analog prefiltration. The output signals of the individual polynomial filters are composed via a selector device 23 to the final filter signal (filter output y).

All filters, estimators and control groups shown in the flow chart of FIG. 2 are combined in FIG. 1 to control unit 3. Essential parts of this control unit can be realized e.g. by a microprocessor or a PC.

A device described above involving a dosing into a processing container can naturally also be used in the inverse direction of flow for a pulsation-free removal of a substance from a processing container. The directions of flow and of rotation of the pumps shown in FIG. 1 are reversed in this instance.

We claim:

1. In a method for the gravimetric control of a mass flow from or into a container located on a balance using a pulsating dosing pump, comprising wherein the output signal of the balance is digitally filtered, the course in time of the mass flow is cyclically estimated from the filtered weighing signal, this estimated value of the course in time of the mass flow is used to calculate the course in time of an auxiliary mass flow which compensates the pulsation of the mass flow of the pulsating dosing pump and a speed course is calculated from the course in time of the auxiliary mass flow for driving an auxiliary dosing pump.

2. The method according to claim 1, wherein the output signal of the balance is prefiltered in an analog manner before it is supplied to the digital filter, whereby the upper limiting frequency of this analog deep-pass filter is between 15 Hz and 25 Hz.

3. The method according to claim 2, wherein a triple polynomial filter is used as digital filter.

4. The method according to claim 3, wherein the course in time of the mass flow is determined with a non-linear estimating algorithm.

5. The method according to claim 4 wherein the average time value of the delivery force of the auxiliary dosing pump is zero.

6. The method according to claim 5, wherein the course in time of the mass flow of the dosing pump is determined over at least one cycle in a learning phase with the auxiliary dosing pump standing still.

7. The method according to claim 5, wherein the course in time of the mass flow of the auxiliary dosing pump is determined over at least one cycle in a learning phase with the dosing pump standing still.

8. In a device for the gravimetric control of a mass flow with a dosing pump which doses the material to be dosed from or into a container located on a balance, whereby the delivery force of the dosing pump comprises pulsating components, with a control unit which regulates the delivery force of the dosing pump on the basis of the output signal of the balance in such a manner that the average time value of the delivery force achieves a set theoretical value, comprising wherein an auxiliary dosing pump is connected in parallel to the dosing pump, the delivery force of the auxiliary dosing pump is regulated by the control unit in such a manner that the sum of the delivery forces of the two pumps is free of pulsations and the delivery force of the main dosing pump is regulated by the control unit in such a manner that the sum of the delivery forces is maintained at the set theoretical value.

9. The device according to claim 8 wherein the dosing pump and the auxiliary dosing pump are peristaltic pumps.

10. The device according to claim 9, wherein the auxiliary dosing pump is driven by a stepping motor.

* * * * *